(12) United States Patent
Berdichevsky

(10) Patent No.: US 8,919,782 B2
(45) Date of Patent: Dec. 30, 2014

(54) DYNAMIC LAY DOWN LIP SEAL WITH BIDIRECTIONAL PUMPING FEATURE

(71) Applicant: Freudenberg-NOK General Partnership, Plymouth, MI (US)

(72) Inventor: Alexander Berdichevsky, Farmington Hills, MI (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 272 days.

(21) Appl. No.: 13/655,812

(22) Filed: Oct. 19, 2012

(65) Prior Publication Data

US 2014/0110904 A1    Apr. 24, 2014

(51) Int. Cl.
    *F16J 15/32*    (2006.01)
(52) U.S. Cl.
    USPC ........................... 277/551; 277/549; 277/559
(58) Field of Classification Search
    USPC .......................................... 277/549, 551, 559
    See application file for complete search history.

(56) References Cited

U.S. PATENT DOCUMENTS

| | | |
|---|---|---|
| 2,635,907 A | 4/1953 | Heimbuch |
| 2,697,623 A | 12/1954 | Mosher |
| 2,731,284 A | 1/1956 | Chambers, Jr. et al. |
| 2,736,583 A | 2/1956 | Marvin |
| 2,736,585 A | 2/1956 | Riesing |
| 2,736,586 A | 2/1956 | Riesing |
| 2,743,950 A | 5/1956 | Helfrecht et al. |
| 2,797,944 A | 7/1957 | Riesing |
| 3,049,356 A | 8/1962 | Talamonti |
| 3,356,376 A | 12/1967 | Bradfute et al. |
| 3,497,225 A | 2/1970 | Workman |
| 3,527,465 A | 9/1970 | Guinard |
| 3,534,969 A | 10/1970 | Weinand |
| 3,572,734 A | 3/1971 | Holt |
| 3,638,957 A | 2/1972 | Marsi |

(Continued)

FOREIGN PATENT DOCUMENTS

| | | |
|---|---|---|
| EP | 0128645 A2 | 12/1984 |
| EP | 0286211 A2 | 10/1988 |

(Continued)

OTHER PUBLICATIONS

The Journal of Teflon, vol. 11, No. 1 (Jan.-Feb. 1970), Advances in Radial Lip Seals of "Teflon," pp. 2-4.

*Primary Examiner* — Gilbert Lee
(74) *Attorney, Agent, or Firm* — Daniel J. Sepanik, Esq.; Harness, Dickey & Pierce, P.L.C.

(57) ABSTRACT

A dynamic lip seal is provided for sealing between a housing and a shaft and with a fluid medium to be sealed on an oil side and air on an air side of the seal. The seal includes a seal lip extending from a seal body and including a shaft contact portion adapted for engagement with the shaft and including a static band and a first set of spiral grooves disposed on an oil side of the static band, and a second set of spiral grooves on an air side of the static band. The first and second sets of spiral grooves are both configured to pump oil toward the static band when the shaft is rotated in a first direction, and the first and second sets of spiral grooves are both configured to pump oil away from the static band when the shaft is rotated in a second direction.

10 Claims, 2 Drawing Sheets

(56) References Cited

U.S. PATENT DOCUMENTS

Figure 1:
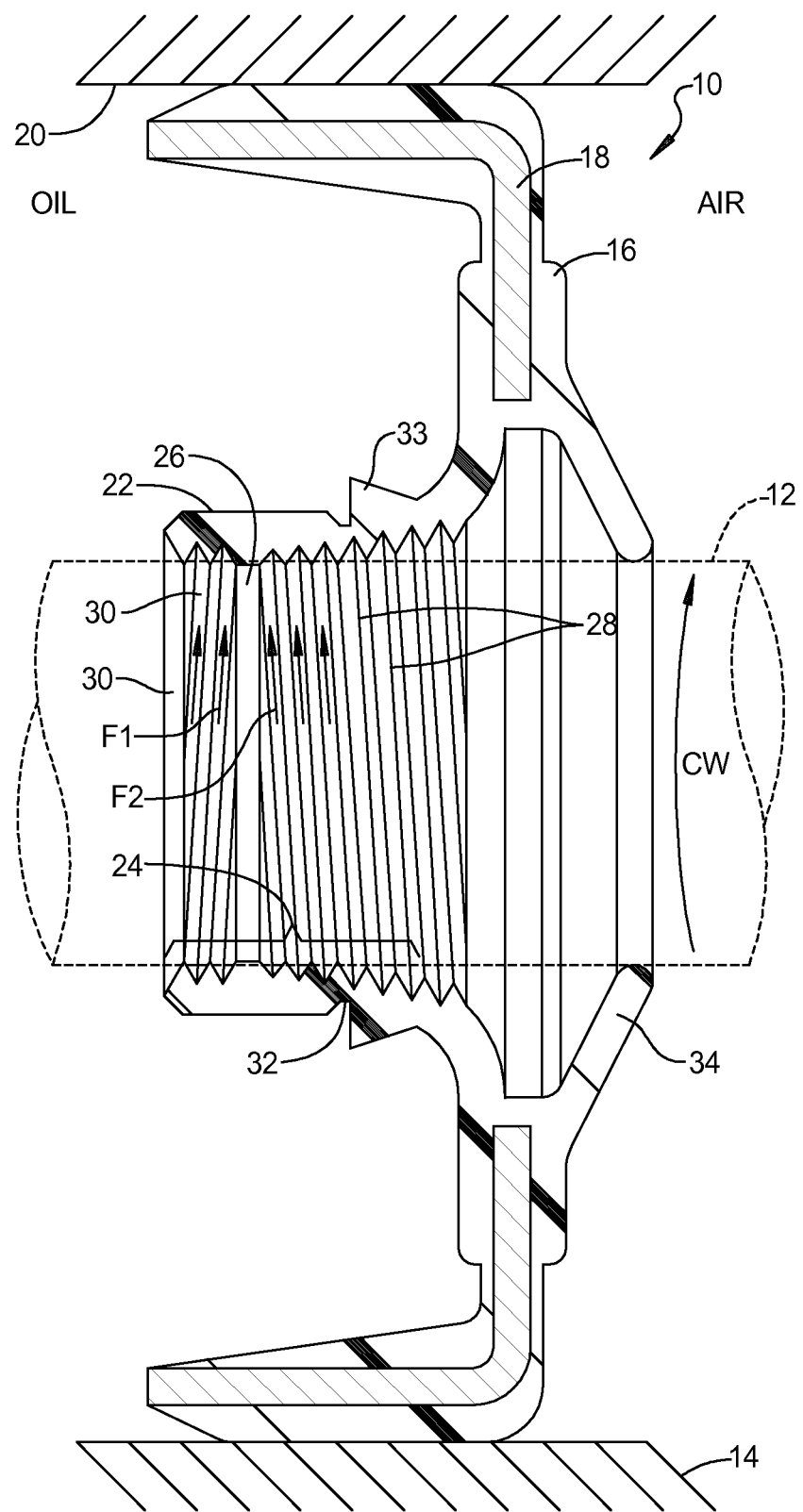

| Patent Number | | Date | Inventor |
|---|---|---|---|
| 3,822,890 | A | 7/1974 | Bourgeois |
| 3,913,925 | A | 10/1975 | Gyory |
| 3,923,315 | A | 12/1975 | Hadaway |
| 3,934,888 | A | 1/1976 | Lutz |
| 3,941,396 | A | 3/1976 | Bailey et al. |
| 3,984,113 | A | 10/1976 | Bentley |
| 3,988,078 | A | 10/1976 | Barker |
| 4,008,014 | A | 2/1977 | Staebler |
| 4,037,849 | A | 7/1977 | Thumm |
| 4,055,106 | A | 10/1977 | Frey |
| 4,084,826 | A | 4/1978 | Vossieck et al. |
| 4,106,781 | A | 8/1978 | Benjamin et al. |
| 4,111,436 | A | 9/1978 | Yazawa |
| 4,118,856 | A | 10/1978 | Bainard et al. |
| 4,119,324 | A | 10/1978 | Denton et al. |
| 4,132,421 | A | 1/1979 | Corsi et al. |
| 4,256,208 | A | 3/1981 | Najer et al. |
| 4,274,641 | A | 6/1981 | Cather, Jr. |
| 4,344,631 | A | 8/1982 | Winn |
| 4,449,717 | A | 5/1984 | Kitawaki et al. |
| 4,451,050 | A | 5/1984 | Repella |
| 4,487,561 | A | 12/1984 | Eiermann |
| 4,497,496 | A | 2/1985 | Repella |
| 4,501,431 | A | 2/1985 | Peisker et al. |
| 4,568,092 | A | 2/1986 | Hayashida et al. |
| 4,585,236 | A | 4/1986 | Simmons et al. |
| 4,635,947 | A | 1/1987 | Hatayama |
| 4,695,063 | A * | 9/1987 | Schmitt et al. ............... 277/559 |
| 4,705,277 | A | 11/1987 | Repella |
| 4,822,058 | A | 4/1989 | Butler et al. |
| 4,844,484 | A | 7/1989 | Antonini et al. |
| 4,845,828 | A | 7/1989 | Reed |
| 4,886,281 | A | 12/1989 | Ehrmann et al. |
| 4,986,553 | A | 1/1991 | Preston et al. |
| 4,995,621 | A | 2/1991 | Devouassoux et al. |
| 5,002,289 | A | 3/1991 | Yasui et al. |
| 5,004,248 | A | 4/1991 | Messenger et al. |
| 5,009,583 | A | 4/1991 | Carlsson et al. |
| 5,118,267 | A | 6/1992 | Dollhopf |
| 5,190,440 | A | 3/1993 | Maier et al. |
| 5,195,757 | A | 3/1993 | Dahll |
| 5,201,531 | A | 4/1993 | Lai |
| 5,292,199 | A | 3/1994 | Hosbach et al. |
| 5,370,404 | A | 12/1994 | Klein et al. |
| 5,498,007 | A | 3/1996 | Kulkarni et al. |
| 5,509,667 | A | 4/1996 | Klein et al. |
| 5,664,787 | A | 9/1997 | Fuse et al. |
| 5,692,757 | A | 12/1997 | Straub |
| 5,755,446 | A | 5/1998 | Dean et al. |
| 5,791,658 | A | 8/1998 | Johnston |
| 5,860,656 | A | 1/1999 | Obata et al. |
| 5,957,461 | A | 9/1999 | Ulrich |
| 6,168,164 | B1 | 1/2001 | Toth et al. |
| 6,170,083 | B1 | 1/2001 | Adl-Tabatabai |
| 6,170,834 | B1 | 1/2001 | Vogt |
| 6,350,732 | B1 | 2/2002 | Moore et al. |
| 6,357,325 | B1 | 3/2002 | Vogt |
| 6,400,917 | B2 | 6/2002 | Nakazato et al. |
| 6,409,177 | B1 | 6/2002 | Johnston |
| 6,420,801 | B1 | 7/2002 | Seefeldt |
| 6,428,013 | B1 | 8/2002 | Johnston et al. |
| 6,520,507 | B2 | 2/2003 | Pataille et al. |
| 6,601,855 | B1 | 8/2003 | Clark |
| 6,702,293 | B2 | 3/2004 | Endo et al. |
| 6,726,213 | B2 | 4/2004 | Wang |
| 6,729,624 | B1 | 5/2004 | Johnston |
| 6,860,486 | B2 | 3/2005 | Hacker et al. |
| 6,921,080 | B2 | 7/2005 | Johnen |
| 7,004,471 | B2 | 2/2006 | Bryde et al. |
| 7,044,470 | B2 | 5/2006 | Zheng |
| 7,134,669 | B2 | 11/2006 | Uhrner |
| 7,494,130 | B2 | 2/2009 | Berdichevsky |
| 7,775,528 | B2 | 8/2010 | Berdichevsky |
| 7,832,100 | B2 * | 11/2010 | Toth et al. ............... 29/888.3 |
| 7,891,670 | B2 * | 2/2011 | Alajbegovic ............... 277/559 |
| 2003/0006563 | A1 | 1/2003 | Cater et al. |
| 2003/0098549 | A1 | 5/2003 | Mellet et al. |
| 2003/0230850 | A1 | 12/2003 | Bruyere et al. |
| 2006/0022414 | A1 | 2/2006 | Balsells |
| 2007/0187904 | A1* | 8/2007 | Berdichevsky ............... 277/559 |
| 2007/0187905 | A1* | 8/2007 | Berdichevsky ............... 277/559 |

FOREIGN PATENT DOCUMENTS

| | | |
|---|---|---|
| EP | 0432287 A1 | 6/1991 |
| EP | 0447766 A2 | 9/1991 |
| EP | 0564153 A1 | 10/1993 |
| EP | 0657641 A2 | 6/1995 |
| EP | 0684413 A1 | 11/1995 |
| EP | 0879977 A2 | 11/1998 |
| EP | 1026428 A2 | 8/2000 |
| EP | 1455122 A1 | 9/2004 |
| JP | 62067372 A | 3/1987 |
| JP | 2000320689 A | 11/2000 |
| JP | 2001165327 A | 12/2002 |
| WO | 9602777 A1 | 2/1996 |
| WO | 9615397 A1 | 5/1996 |

* cited by examiner

DYNAMIC LAY DOWN LIP SEAL WITH BIDIRECTIONAL PUMPING FEATURE

FIELD

The present disclosure relates to a lay down lip seal, and more particularly to a dynamic lay down lip seal with bidirectional pumping feature.

BACKGROUND AND SUMMARY

This section provides background information related to the present disclosure which is not necessarily prior art.

Rotary shaft seals have been used in machinery, the automotive industry, as well as other industries. For example, such applications can include use on transmissions, pinions, gears, axles, etc. that require a symmetrical functioning dynamic seal (i.e., the seal must function effectively in both directions of shaft rotation). The seal has an air side and a lubricant or oil side. The seal helps maintain the lubricant (e.g., oil) on the lubricant side. Lubricant may, however, leak from a lubricated side to the non-lubricated (air) side through the interaction of the active surfaces of the seal with the shaft. Spiral grooves or built-up ribs (hereinafter collectively referred to as "grooves") disposed on the active side of the seal capture the leaked lubricant and hydrodynamically pump the lubricant back into the lubricated side due to relative rotation between the seal and the shaft about which the seal is disposed.

Typically, the grooves are arranged in a spiral or helical configuration on the shaft, contacting side of the seal. In order to enable hydrodynamic pumping of captured lubricant, the grooves spiral along the active surface of the seal in opposite directions to accommodate relative rotation between the shaft and the seal regardless of the direction of the relative rotation. The grooves are open at the lubricant side of the seal and communicate with the lubricant therein. Having the grooves at the lubricant side of the seal creates potential problems. For example, static oil leaks can develop. Additionally, air leakage during pressurization testing of the machinery on which the seal is being used at the end of the assembly stage can also occur. Accordingly, it would be advantageous to provide a dynamic seal having a bi-directional pattern thereon to capture lubricant that leaks past the seal edge and returns the same to the lubricant side of the seal. Furthermore, it would be advantageous if such a dynamic seal minimized and/or avoided the drawbacks mentioned above.

A dynamic laydown lip seal according to the principles of the present disclosure includes two opposite sets of spiral grooves separated by a small static band all on the contact surface of the seal where the seal engages the shaft. When the shaft rotation direction is causing the oil side grooves to pump oil toward the oil side, the oil cannot reach the air side grooves, thus, the air side grooves are not hydrodynamically engaged and the seal maintains normal function. When the shaft is rotating in the opposite direction, the oil side grooves will be pumping oil toward the air side past the static dam with a first pump rate. When this oil flow overwhelms the static band, the oil gets into the air side pumping grooves hydrodynamically engaging them wherein the air side pumping grooves pump the oil back towards the static dam and towards the oil side. The air side spiral grooves are designed to provide greater pumping capacity than the oil side spiral grooves so that the net effect is that the oil that passes the static dam is continually returned toward the oil side by the higher capacity air side spiral grooves.

The individual grooves of the oil side and air side sets of spiral grooves can be symmetrical in shape and the number of grooves in the air side set of grooves can exceed a number of grooves in the oil side set of grooves so that the capacity of the set of air side spiral grooves exceeds the capacity of the oil side spiral grooves.

The air side set of spiral grooves can include grooves that each include a booster zone adjacent the static band wherein in the booster zone the grooves reduce in cross-sectional area as the grooves get closer to the static dam. This booster zone can cause an increase in the pressure on the air side of the static dam causing the oil on the oil side of the static dam to be pushed back towards the oil side.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
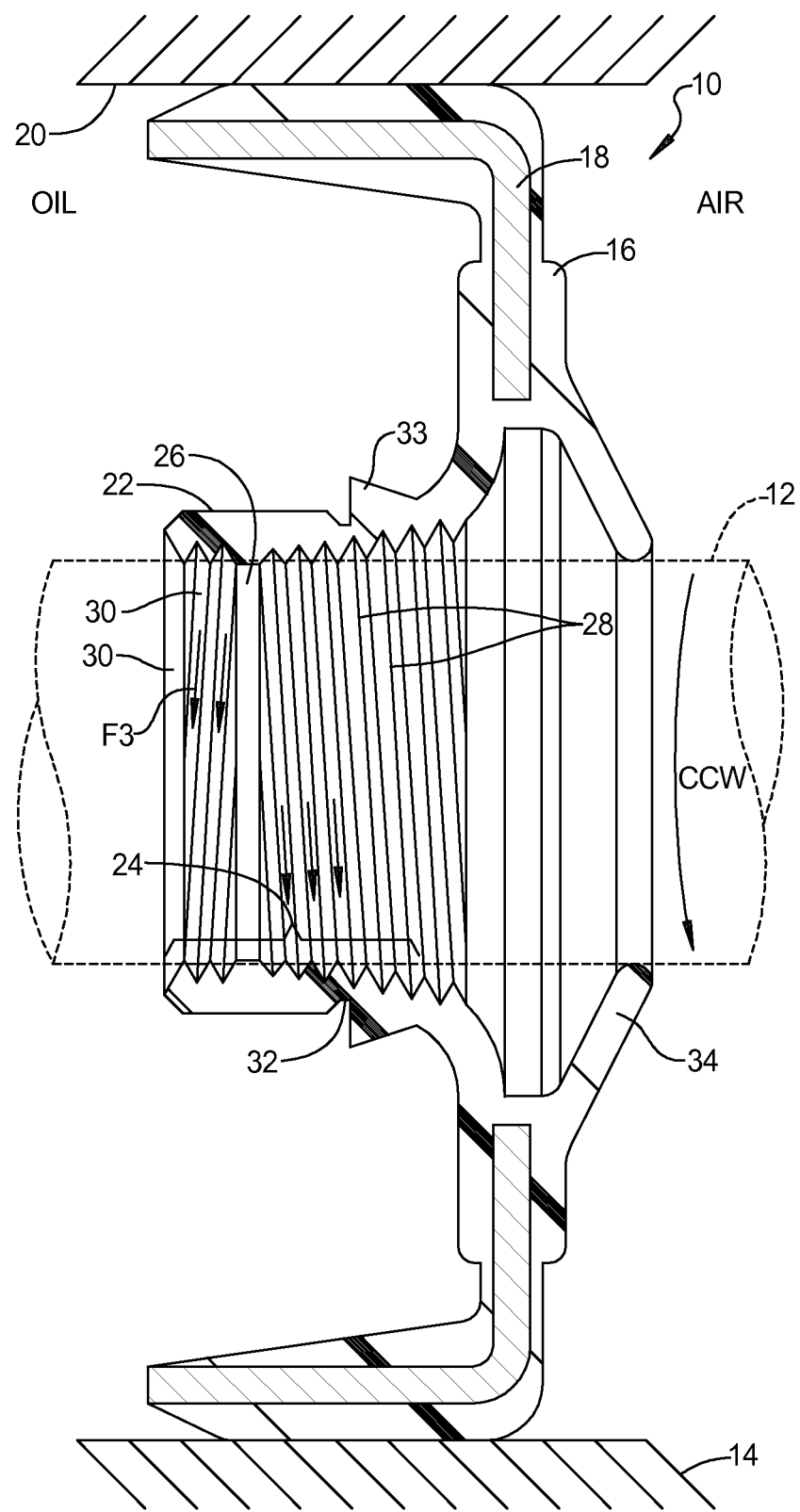

FIG. 1 is a cross-sectional view of a dynamic lay down lip seal according to the principles of the present disclosure, and illustrating the direction of oil flow on each side of the static dam when the shaft is rotating in a first direction; and FIG. 2 is a cross-sectional view of the lay down lip seal shown in FIG. 1 with the direction of oil flow being illustrated for the shaft rotating in an opposite direction.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a dynamic lay down lip seal 10 for sealing between a shaft 12 and a housing 14 will now be described. The lip seal 10 includes a seal body 16 that is designed to be received in a bore 20 within the housing 14. A retainer 18 can be overmolded within the seal body 16. A seal lip 22 extends from the seal body 16 and includes a shaft contact surface 24 on an inner face thereof for contacting the shaft 12. The shaft contact surface 24 extends along a length of the shaft and includes a static band region 26 defined by a continuous annular band region that engages the shaft 12. An air side set of spiral grooves 28 extend from the static band 26 towards an air side "AIR" of the seal 10. A set of oil side spiral grooves 30 are provided on an oil side opposite of the static band 26 from the air side spiral grooves 28 and have an opposite spiral orientation relative to the spiral grooves 28 on the air side. The static band 26 can be flush with, or slightly below or above, the tips of the oil side and air side ribs that define the grooves 28, 30.

The seal lip 22 can include a hinge portion 32 in the shaft contact surface region 24 of the seal lip 22. The hinge portion can be defined by a region of decreased thickness on the back side of the seal lip 22 in the shaft contact surface region 24. An area of increased thickness 33 can be disposed adjacent to the hinge portion 32. The hinge portion 32 and the area of increased thickness 33 help to ensure that both the oil side and the air side portions of the seal lip 22 contact the rotating shaft without excessive friction and pump the oil as desired. The hinge portion can be alternatively formed by a set of multiple grooves on a back side of the seal contact surface region 24 to produce improved control over the contact between the seal and the shaft, especially in a misaligned condition.

When the shaft 12 is rotated in a first direction, as illustrated in FIG. 1 by the rotational directional arrow CW, oil from the oil side is pumped in the direction of arrows F1 from the oil side toward the static dam 26. The oil that passes through the static dam 26 is received in the air side spiral grooves 28 and is then pumped in the direction of arrow F2 back towards the static dam 26. When the shaft is rotating in the direction CW, the oil side grooves will be pumping oil toward the air side with the pump rate Q1. When this oil flow overwhelms the static band, the oil gets into the air side pumping grooves 28 hydrodynamically engaging them. If the pump rate of the air side spiral grooves 28 is Q2, and Q2 is greater than Q1, then the effect will be a positive pumping with the pump rate $Q=Q2-Q1$. For as long as Q is greater than 0, the seal will maintain a proper function with that direction of the shaft rotation. To make the seal perform equally in both shaft directions, Q should be equal to Q1. Thus, Q2 should be equal to two times Q1 for the situation where the seal is desired to perform equally in both shaft directions. This is not a requirement for proper operation, but would be necessary for symmetrical bi-directional operation.

One example of the groove structure satisfying the requirement of Q2 equaling two times Q1, is that the cross sections of the oil and air side grooves 30, 28 are selected to be identical and the number of air side grooves is two times the number of oil side grooves. In this case, the pump rate of each individual groove on the air side is the same as of the individual grooves on the oil side, but since the number of grooves on the air side is double the number of grooves on the oil side, the capacity of the grooves 28 on the air side causes the pump rate Q2 to be exactly equal to two times Q1.

Performance of the air side grooves 28 can be further improved by designing into the grooves a booster zone in a vicinity of the static band 26. In the booster zone, the cross-sectional area of the grooves 28 would be reducing as the grooves 28 approach the static band 26, thus raising the pressure generated on the opposite side of the static band 26 from the oil side grooves 30. This measure allows a reduction in the total amount of oil consistently present in the air side grooves thus improving oil carbonation resistance of these grooves. Although this measure may be desirable, it is not necessary for the operation of the seal of the present disclosure.

With reference to FIG. 2, it is noted that when the shaft 12 is rotated in the opposite direction indicated by arrow CCW, oil from the oil side is pumped back toward the oil side (in the direction F3) by the oil side grooves 30 so that the oil never goes beyond the static dam 26. It is noted that during a static condition of the shaft 12, oil that is disposed against the seal 10 may seep through the grooves 30 up to the static dam 26 which prevents the oil from passing through to the air side spiral grooves 28. The presence of oil within the seal provides for lubrication between the shaft and seal in order to prevent premature wear of the seal.

It is noted that the seal can be made from rubber, polytetrafluoroethylene (PTFE) or other plastic seal materials. It is further noted that a dust lip 34 can be provided on the air side of the seal 10 to prevent dust from reaching the air side spiral grooves 28 and contaminating the engagement between the shaft 12 and seal 10. The present disclosure provides a solution to the longstanding problem of bi-directional performance of lay down seals by accounting for proper lubrication and return of oil during shaft rotation in either direction.

The seal 10 of the present application is desirable for use in asymmetric applications wherein the shaft is typically rotated in a direction that causes the oil to be pumped toward the static dam 26 by the oil side grooves 30 so that the shaft contact surface is well lubricated. Yet, when the shaft is rotated intermittently in an opposite direction for relatively shorter durations, the contact surface can be maintained in a sufficiently lubricated state.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A dynamic lay down lip seal for sealing between a housing and a shaft and with a fluid medium to be sealed on an oil side and air on an air side of the seal, comprising:
   a seal body adapted to be received in a bore in the housing; and
   a seal lip extending from the seal body and including a shaft contact portion adapted for engagement with the shaft and including a static band defining an annular region that continuously contacts the shaft around a circumference of the shaft and including a first set of spiral grooves disposed on an oil side of the static band, and a second set of spiral grooves on the air side of the static band, the first and second sets of spiral grooves both being configured to pump oil toward the static band when the shaft is rotated in a first direction, and the first and second sets of spiral grooves both being configured to pump any oil therein away from the static band when the shaft is rotated in a second direction.

2. The seal according to claim 1, wherein the second set of spiral grooves are configured to have a higher pumping capacity than the first set of spiral grooves when the shaft is rotated in the first direction.

3. The seal according to claim 1, wherein individual grooves of the first and second sets of spiral grooves are symmetrical in shape and a number of grooves in the second set of grooves exceeds a number of grooves in the first set of grooves.

4. The seal according to claim 3, wherein the number of grooves in the second set of grooves is at least double the number of grooves in the first set of grooves.

5. The seal according to claim 1, wherein the first and second sets of grooves have a peak portion disposed between the grooves, wherein a height of the static band is smaller than a height of the peak portion.

6. The seal according to claim 1, wherein said seal lip is made from rubber.

7. The seal according to claim 1, wherein said seal lip is made from polytetrafluoroethylene.

8. The seal according to claim 1, wherein said second set of spiral grooves include a booster zone adjacent the static band wherein the grooves in the booster zone reduce in cross-sectional area as the grooves get closer to the static band.

9. The seal according to claim 1, further comprising a hinge portion defined by a region of decreased thickness in the shaft contact portion of the seal lip.

10. The seal according to claim 9, wherein said shaft contact portion includes a region of increased relative thickness adjacent to said hinge portion.

* * * * *